United States Patent
Allen-Ware et al.

(10) Patent No.: US 9,009,503 B2
(45) Date of Patent: Apr. 14, 2015

(54) BRANCH CIRCUIT DETERMINATION WITHOUT EXTERNAL SYNCHRONIZATION

(75) Inventors: Malcolm Scott Allen-Ware, Austin, TX (US); Wael El-Essawy, Austin, TX (US); Alexandre Peixoto Ferreira, Austin, TX (US); Thomas Walter Keller, Jr., Austin, TX (US); Karthick Rajamani, Austin, TX (US); Juan Carlos Rubio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 13/542,532

(22) Filed: Jul. 5, 2012

(65) Prior Publication Data

US 2014/0013126 A1 Jan. 9, 2014

(51) Int. Cl.
*G06F 1/26* (2006.01)
*H02J 13/00* (2006.01)

(52) U.S. Cl.
CPC .................................... *H02J 13/002* (2013.01)

(58) Field of Classification Search
CPC ...................................................... H02J 13/002
USPC ........................................................ 713/300
See application file for complete search history.

(56) References Cited

U.S. PATENT DOCUMENTS

| | | | |
|---|---|---|---|
| 3,745,458 A | 7/1973 | Nakamura et al. | |
| 3,937,899 A | 2/1976 | Denenberg | |
| 4,298,970 A | 11/1981 | Shawhan et al. | |
| 4,594,727 A | 6/1986 | Pierce | |
| 5,323,337 A | 6/1994 | Wilson et al. | |
| 5,440,587 A | 8/1995 | Ishikawa et al. | |
| 5,818,875 A | 10/1998 | Suzuki et al. | |
| 5,881,057 A | 3/1999 | Komatsu | |
| 6,166,532 A * | 12/2000 | Coia et al. | 324/67 |
| 6,762,987 B2 | 7/2004 | Langereis et al. | |
| 7,148,743 B2 | 12/2006 | Paille et al. | |
| 7,269,753 B2 | 9/2007 | Farkas et al. | |
| 7,333,000 B2 | 2/2008 | Vassallo | |
| 7,385,406 B1 | 6/2008 | Blades | |
| 2009/0217073 A1 | 8/2009 | Brech et al. | |
| 2009/0287949 A1* | 11/2009 | Bradicich et al. | 713/340 |
| 2009/0307515 A1 | 12/2009 | Bandholz et al. | |
| 2012/0099633 A1 | 4/2012 | Casagrande | |

FOREIGN PATENT DOCUMENTS

| | | |
|---|---|---|
| JP | 2007240261 A | 7/1973 |
| JP | 07229337 A | 2/1994 |
| JP | 10023081 A | 7/1996 |

\* cited by examiner

*Primary Examiner* — Albert Wang
(74) *Attorney, Agent, or Firm* — Garg Law Firm, PLLC; Rakesh Garg; William J. Stock

(57) ABSTRACT

A method, system, and computer program product for relating a data processing system with a power branch circuit are provided in the illustrative embodiments. Each signal in a set of signals is combined with a power signal to form a set of combination signals, the power signal including a first power usage by the data processing system and a second power usage by a modulating signal. An amplitude of a corresponding signal in each combined signal in the set of combined signals is determined over a period. Using a discriminating logic, a determination is made whether the modulating signal is present in the power signal. Responsive to the discriminating logic producing an affirmative result, the data processing system is related with the power branch circuit.

20 Claims, 9 Drawing Sheets

BRANCH CIRCUIT DETERMINATION WITHOUT EXTERNAL SYNCHRONIZATION

BACKGROUND

1. Technical Field

The present invention relates generally to a method, system, and computer program product for managing electrical power in a data processing environment. More particularly, the present invention relates to a method, system, and computer program product for correlating systems with power branch circuits in the data processing environment without using an external synchronization signal in a correlation technique.

2. Description of the Related Art

Data processing environments often include multiple data processing systems. The data processing systems each have a need for electrical power for performing their respective functions.

An electrical power distribution system can supply power to several data processing systems. Particularly, an electrical power distribution system includes several power branch circuits, each power branch circuit supplying power to several systems and equipment in the data processing environment.

Knowing which system is supplied power from which power branch circuit is important. In a data processing environment, the number and location of the systems, equipment, and power branch circuits can result in a complex network of interconnected systems and power branch circuits. Consequently, learning the relationships between systems and corresponding power branch circuits is a non-trivial problem.

SUMMARY

The illustrative embodiments provide a method, system, and computer program product for branch circuit determination without external synchronization. In at least one embodiment, a method for relating a data processing system with a power branch circuit is provided. The method includes combining, to form a set of combination signals, each signal in a set of signals with a power signal, the power signal including a first power usage by the data processing system and a second power usage by a modulating signal. The method further includes determining an amplitude of a corresponding signal in each combined signal in the set of combined signals over a period. The method further includes determining, using a discriminating logic, whether the modulating signal is present in the power signal. The method further includes relating, responsive to the discriminating logic producing an affirmative result, the data processing system with the power branch circuit.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
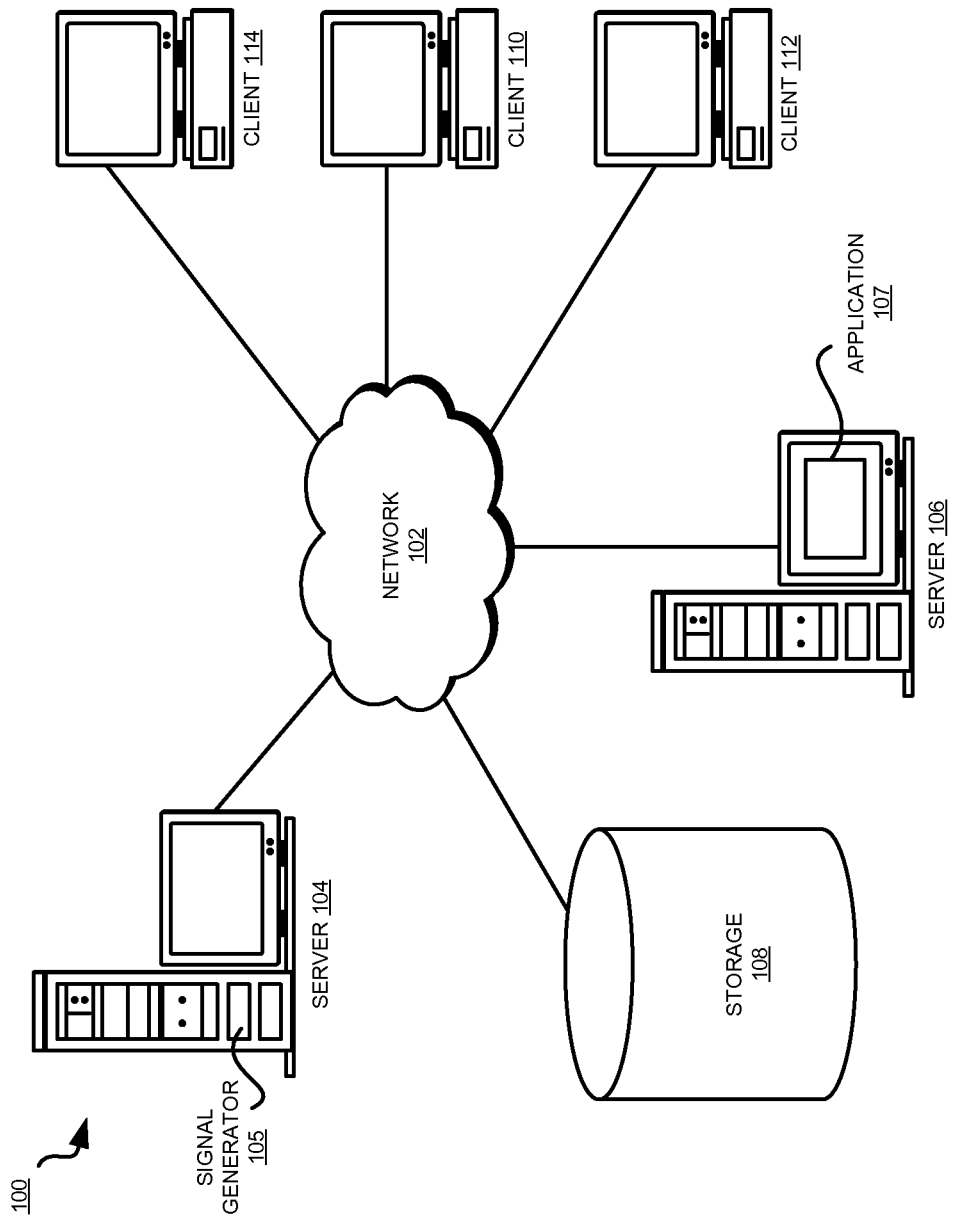
FIG. 1 depicts a pictorial representation of a network of data processing systems in which illustrative embodiments may be implemented.

In certain data processing environment configurations, several data processing systems may be configured to receive power from a power branch circuit and several such power branch circuits may provide power to several data processing systems. For example, servers 1, 4, 5, 13, 14, and 19 may be supplied power from power branch circuit 1; servers 2, 6, 7, 15, 16, and 20 may be supplied power from power branch circuit 2; servers 3, 8, 9, and 10 may be supplied power from power branch circuit 3; servers 11, 12, and 14 may be supplied power from power branch circuit 4; and servers 17 and 18 may be supplied power from power branch circuit 5.

Furthermore, systems in a data processing environment may be switched from one power branch circuit to another for a variety of reasons. For example, equipment in power branch circuit 4 may have to be shut down for maintenance and the load redistributed to other power branch circuits according to available capacity on those power branch circuits at that time.

As can be seen, with just twenty example servers and five power branch circuits, managing the information about which system receives power from which power branch circuit at any given time is a problem that requires a solution of some complexity. Manually keeping track of such relationships may work for relatively small data processing environments. However, a typical data processing environment can include thousands of data processing systems using a comparable number of power branch circuits. The embodiments recognize that for large number of systems and power branch circuits typically present in a data processing environment, the problem requires a more sophisticated solution.

The embodiments further recognize that causing the system to identify itself, such as by executing a particular code with a specific load characteristic, or by transmitting a system identifier from the system, require access to the system. The embodiments recognize that service personnel, maintenance technicians, and other personnel in a data processing environment may not be able to log-on to a system or otherwise access the system for executing code thereon or transmitting identifiers there from.

The embodiments recognize that allowing access to a system in a data processing environment, such as for executing code is a security risk. The embodiments also recognize that physical access to the systems, without the ability to log-on to the systems is often available to data processing environment personnel. For example, a technician may be able to touch a system, move a system, or connect a device to a port on the system without having a login ID and password to the system.

The illustrative embodiments used to describe the invention generally address and solve the above-described system-to-power branch circuit matching problems. The illustrative embodiments provide a method, system, and computer program product for correlating systems with their corresponding power branch circuits using a correlation technique without using an externally synchronized signal as described using the following embodiments.

The invention and various embodiments thereof are described herein primarily with respect to a simplified relationship between a limited number of systems and power branch circuits only for the clarity of the disclosure. The concepts, methods, products, systems, operations, actions, configurations, or manipulations described herein with respect to matching a system to a power branch circuit are similarly applicable to matching any number of systems to any number of power branch circuits without limitation.

Furthermore, several embodiments are described using a server data processing system only as an example for the clarity of the description. An embodiment may be practiced with respect to any type of data processing system allowing physical access to a direct current (DC) powered port thereon, or another system that allows access to a DC powered port of any configuration in a similar manner within the scope of the invention. For example, an embodiment can be used to detect a branch circuit associated with a networking device, a data storage device, or a peripheral of a system within the scope of the illustrative embodiments.

The illustrative embodiments are described using specific code, designs, architectures; layouts, schematics, and tools only as examples and are not limiting on the illustrative embodiments. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
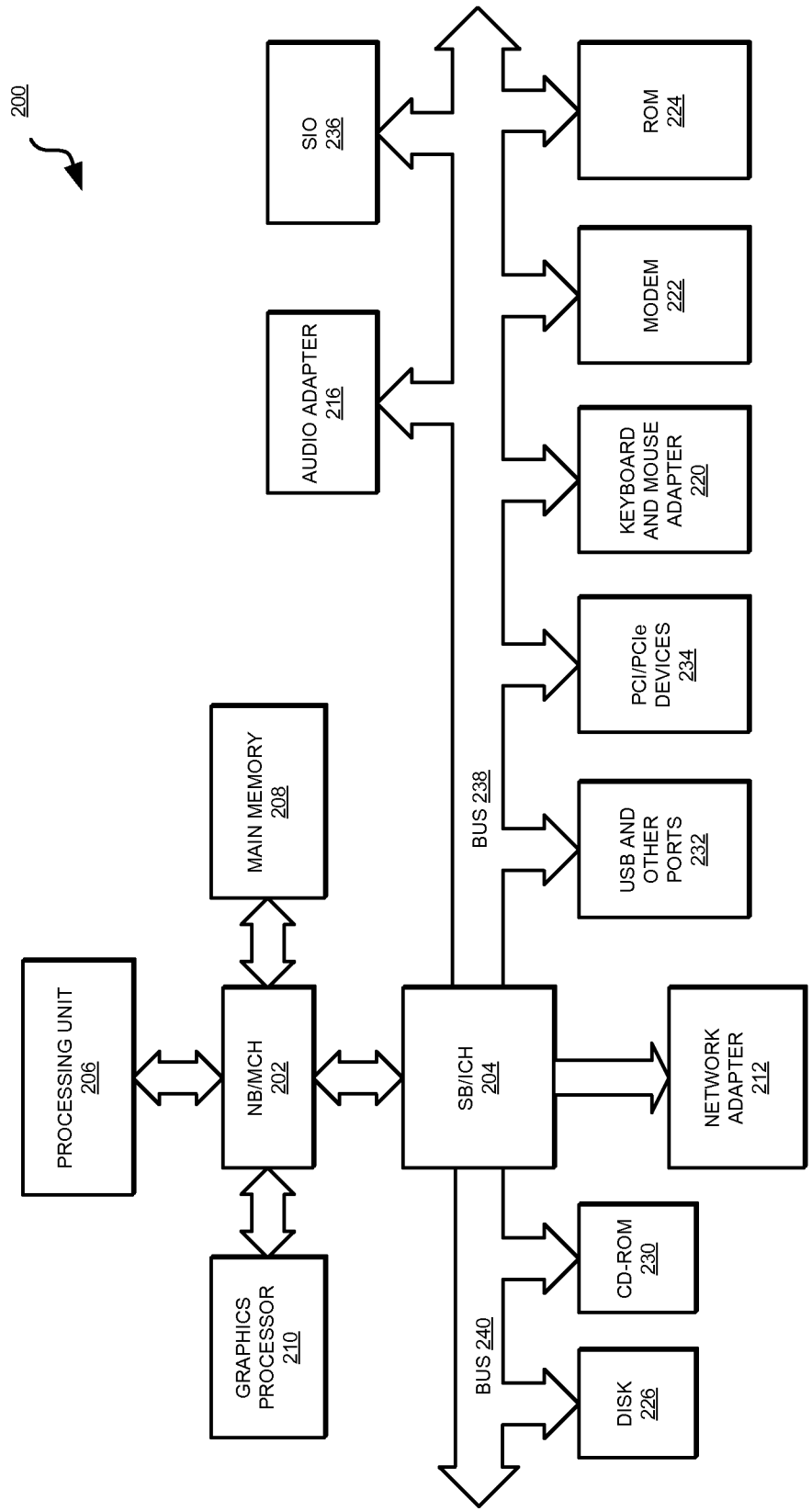
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are used in a correlation technique for branch circuit detection according to an embodiment. For example, signal generator 105 may be any suitable hardware device capable of coupling with server 104. For example, signal generator 105 may couple with server 104 using a DC powered port, such as a universal serial bus (USB) port or a serial port, available on server 104. Application 107 may be an application implementing an embodiment for power branch circuit detection using a correlation technique without externally synchronized signal. Data processing environment 100 may be supplied by a power distribution system (not shown) using a set of power branch circuits (not shown).

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/NCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft Windows (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 107 in FIG. 1 implementing an embodiment, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
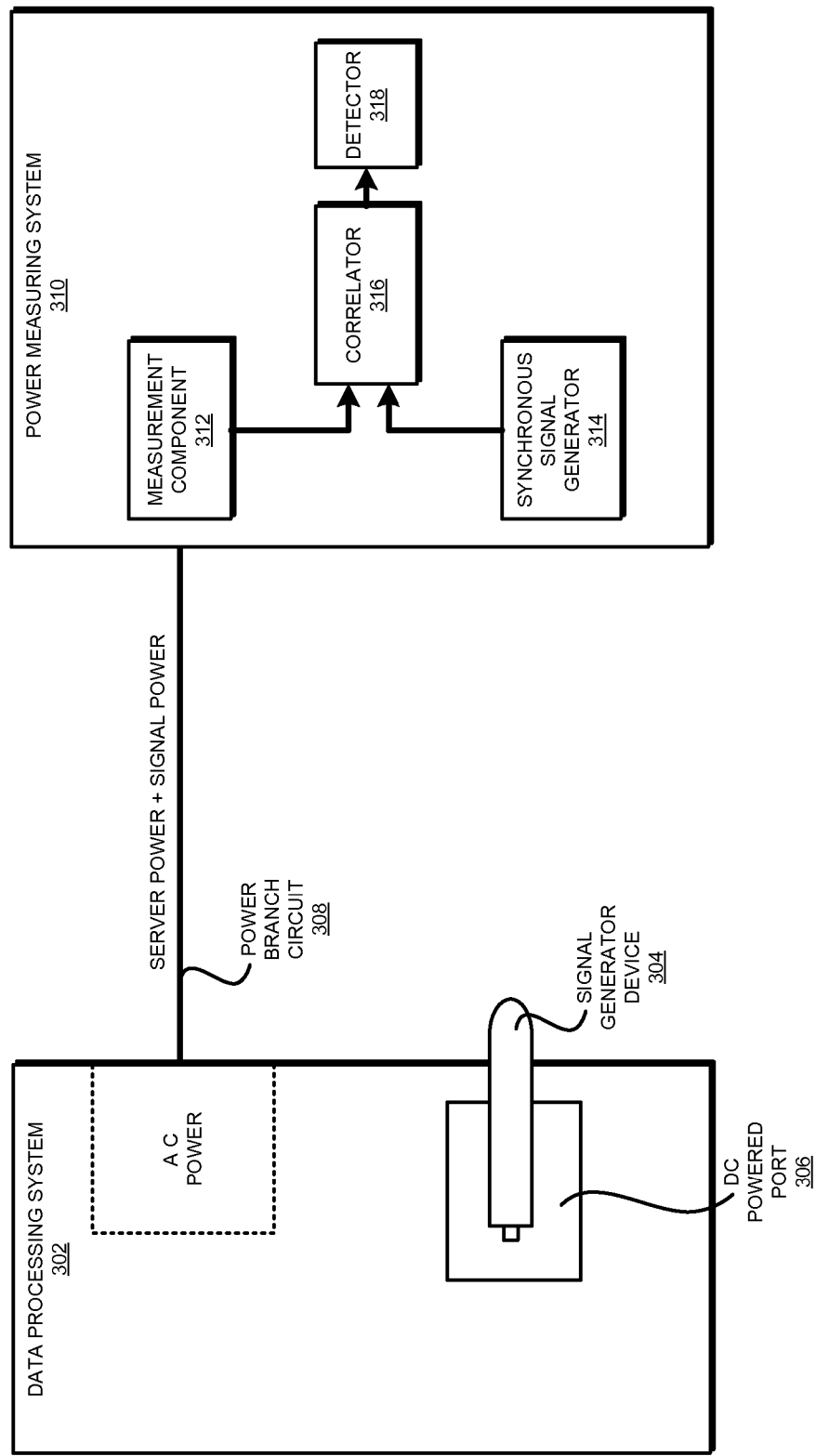
FIG. 3 depicts a block diagram of correlating a system with a power branch circuit using a synchronous correlation technique that can be modified by using an illustrative embodiment.

With reference to FIG. 3, this figure depicts a block diagram of correlating a system with a power branch circuit using a synchronous correlation technique that can be modified by using an illustrative embodiment. Data processing system 302 is analogous to server 104 in FIG. 1 and signal generator device 304 is usable as signal generator device 105 in FIG. 1 and couples to data processing system 302 using DC powered port 306.

Power branch circuit 308 supplies electrical power, typically alternating current (AC) power, to data processing system 302. Power measuring system 310 may be implemented using a combination of hardware and software, for measuring the power delivered over power branch circuit 308. For example, in one embodiment, power measuring system 310 includes electrical power measuring component 312, which may be combination of hardware and software. Signal generator 314 may be hardware or software, correlator 316 may be a software application or firmware, and detector 318 may be a software application or a component thereof. At least a part of power measuring system 310, such as a combination of signal generator 314, correlator 316, and detector 318, can be improved according to an embodiment and implemented as application 107 in FIG. 1.

Signal generator device 304 generates a low frequency low power DC load (signal) to modulate the AC power consumed by data processing system 302. A frequency is considered low if the frequency is a fraction of the frequency of the AC power being supplied to data processing system 302.

Although any low frequency can be selected to implement an embodiment, preferably, the low frequency signal should not be of a frequency higher than half the AC power frequency. In one embodiment, for sixty hertz AC power supplied to data processing system 302, signal generator device 304 was configured to generate a signal of four to six hertz, and for one experiment, a signal of five hertz.

Power of the signal generated by signal generator device 304 is considered low if signal generator device 304's load only trivially changes data processing system 302's power consumption per AC cycle. In other words, the power demand of data processing system 302 is insignificantly altered by adding the signal from signal generator device 304.

A load that is a significant portion of, or comparable to, data processing system 302's power consumption, when added to data processing system 302, would be easily detectable at power measuring system 310 to identify the correlation between data processing system 302 and power branch circuit 308. However, the embodiments recognize that adding such loads for identifying the correlation is undesirable in many circumstances, such as when the additional load may cause a power failure, system shutdown, or a spike in the power demand triggering power consumption reduction measures. Therefore, the signal generated from signal generator device 304 should preferably be a low power signal to avoid such undesirable consequences. Measurement component 312 measures the combined power consumption of data processing system 302 and signal generator device 304 during a sampling interval.

Presently, signal generator 314 generates a synchronous signal, i.e., a signal of the same frequency and phase as the signal of signal generator device 304. The signals of signal generator 304 and synchronous signal generator 314 are synchronized to be in-phase by any suitable method. For example, the synchronization can be accomplished using a synchronization signal, such as a global positioning system (GPS) clock, or exhaustively changing the phase of synchronous signal generator 314 and determining whether a particular phase of signal generator 314's signal matches a phase of a signal in the power curve produced by measurement component 312. A clock and an exhaustive search for in-phase signal are examples of external methods of synchronization that can be avoided by using an embodiment.

Correlator 316 combines the signal generated by signal generator 314 with the power curve produced by measurement component 312. For example, the signal of signal generator 314 is multiplied with the power curve produced by measurement component 312.

Detector 318 determines whether a signal matching the signal generated by signal generator 314 is present in the power curve produced by measurement component 312. This determination made by detector 316 is described in more detail with respect to FIGS. 4 and 5. Generally, if a matching signal is found in the power curve produced by measurement component 312, detector 318 determines that the power branch circuit over which the power curve was measured during the sampling interval is related to system 302, to which signal generator 304 is coupled, signal generator 304 having been synchronized with signal generator 314 as described above.

Figure 4:
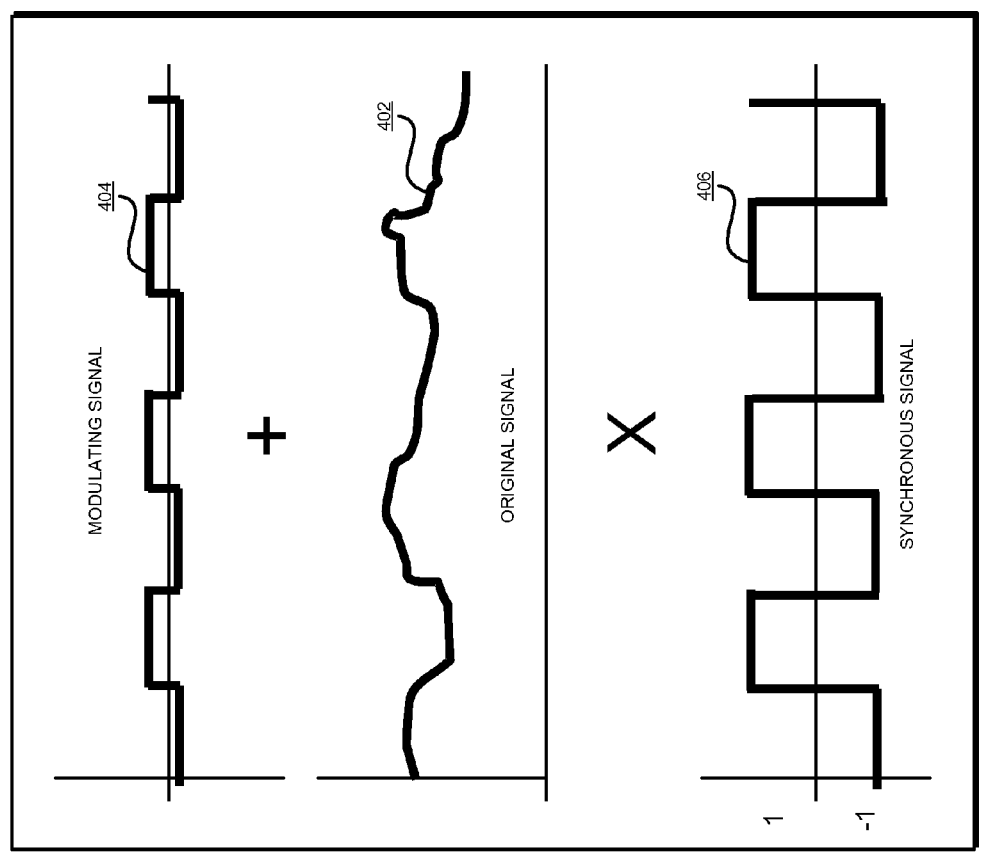
FIG. 4 depicts a set of graphs showing power modulation for associating a system with a power branch circuit.

With reference to FIG. 4, this figure depicts a set of graphs showing power modulation for associating a system with a power branch circuit. Original signal 402 is the power curve of data processing system 302 in FIG. 3, without the signal from signal generator device 304 in FIG. 3.

Modulating, signal 404 is the signal generated by signal generator device 304 in FIG. 3. Original signal 402 and modulating signal 404 combined (added graph not shown) form the power curve measured by measurement component 312 in FIG. 3.

Synchronous signal 406 is the signal generated by signal generator 314 in FIG. 3 and synchronized with modulating signal 404. As shown in this figure, synchronous signal 406 is in-phase with modulating signal 404.

Synchronous signal 406 is multiplied with modulating signal 404 at the power measurement system. The positive part of synchronous signal multiplied with the positive part of in-phase modulating signal yields a positive larger signal. The negative part of synchronous signal multiplied with the negative part of in-phase modulating signal also yields a positive larger signal.

Multiplication of synchronous signal 406 with modulating signal 404 in this manner causes modulating signal 404 to become a positive amplified signal at the power measurement system end of the power branch circuit. Operating in this manner using an externally synchronized signal, present power branch circuit detection systems synchronously detect low power modulating signal 404 to associate a power branch circuit with a data processing system.

Figure 5:
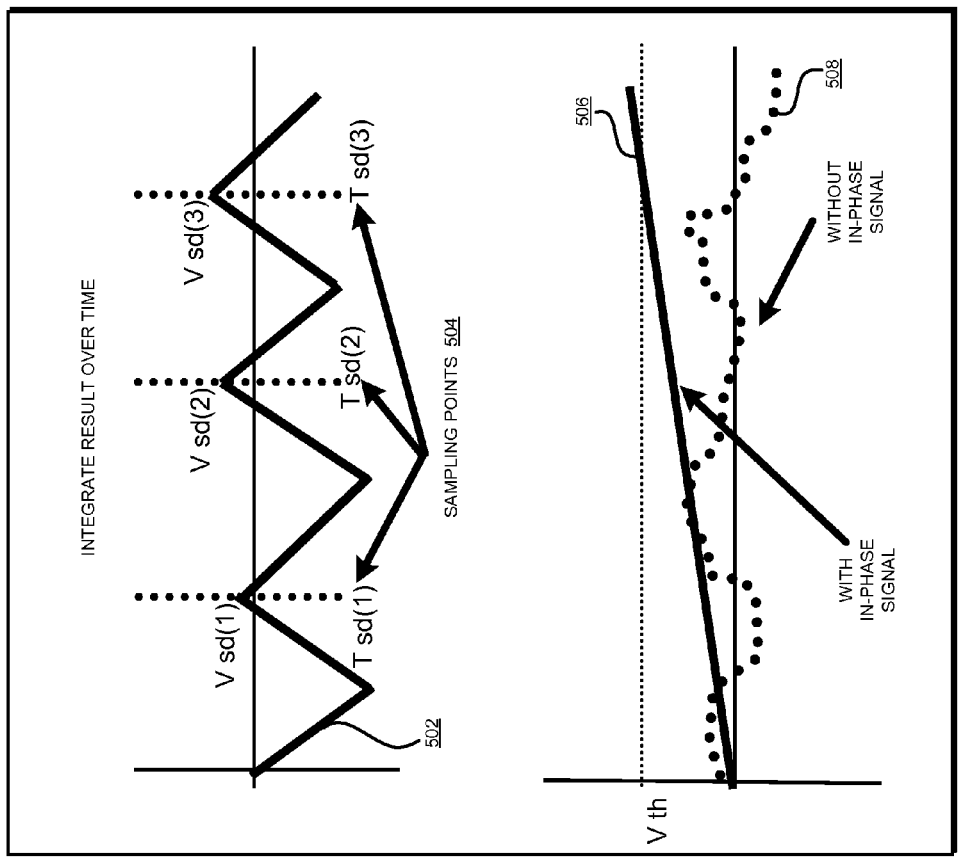
FIG. 5 depicts a set of graphs showing the process for detecting a modulating signal to relate a system with a corresponding power branch circuit.

With reference to FIG. 5, this figure depicts a set of graphs showing the process for detecting a modulating signal to relate a system with a corresponding power branch circuit. Graph 502 shows synchronous signal 406 in FIG. 4 multiplied with modulating signal 404 in FIG. 4 integrated over a sampling period. As measured at sampling points 504 in time, the integrated signal of graph 502 increasingly grows larger with the passage of time. The integrated signal has the frequency of the synchronized signal. The value (amplitude) of this integrated signal $V_{sd(3)}$ at sampling time $T_{sd(3)}$ is greater than $V_{sd(2)}$ at sampling time $T_{sd(2)}$, which is greater than $V_{sd(1)}$ at sampling time $T_{sd(1)}$.

Note that such increase or magnification in the integrated signal will occur only when signal 406 in FIG. 4 is in-phase with, or synchronized with, modulating signal 404 in FIG. 4. When signal 406 in FIG. 4 is out of phase with, or not synchronized with, modulating signal 404 in FIG. 4, such a consistent increase will not be observable at the power measuring system end of the power branch circuit.

Graph 506 shows the consistent increase in the integrated signal value for in-phase synchronous and modulating signals. Graph 508 shows that such a consistent increase will not be observable for out of phase synchronous and modulating signals.

A threshold value for the integrated signal helps eliminate false positives. For example, when the integrated signal value exceeds the threshold value $V_{th}$, the existence of the low power low frequency modulating signal can be confirmed, and the data processing system from where the modulating signal originated can be related to the Power branch circuit on which the integrated signal value exceeded the threshold.

As is evident from the above description, availability of a synchronized signal at the power measuring system is an essential component of the presently available methods for detecting a power branch circuit associated with a data processing system. The illustrative embodiments recognize that such a synchronized signal may not be feasible under certain circumstances. The illustrative embodiments also recognize that the synchronization, even if accomplished, may not be maintainable over a period due to signal drift, clock lag, circuit delays, and many other factors. The illustrative embodiments further recognize that when synchronization is accomplished by exhaustive search of the phase, theoretically, infinite phases are possible in the exhaustive set, making such method of synchronization impractical.

Figure 6:
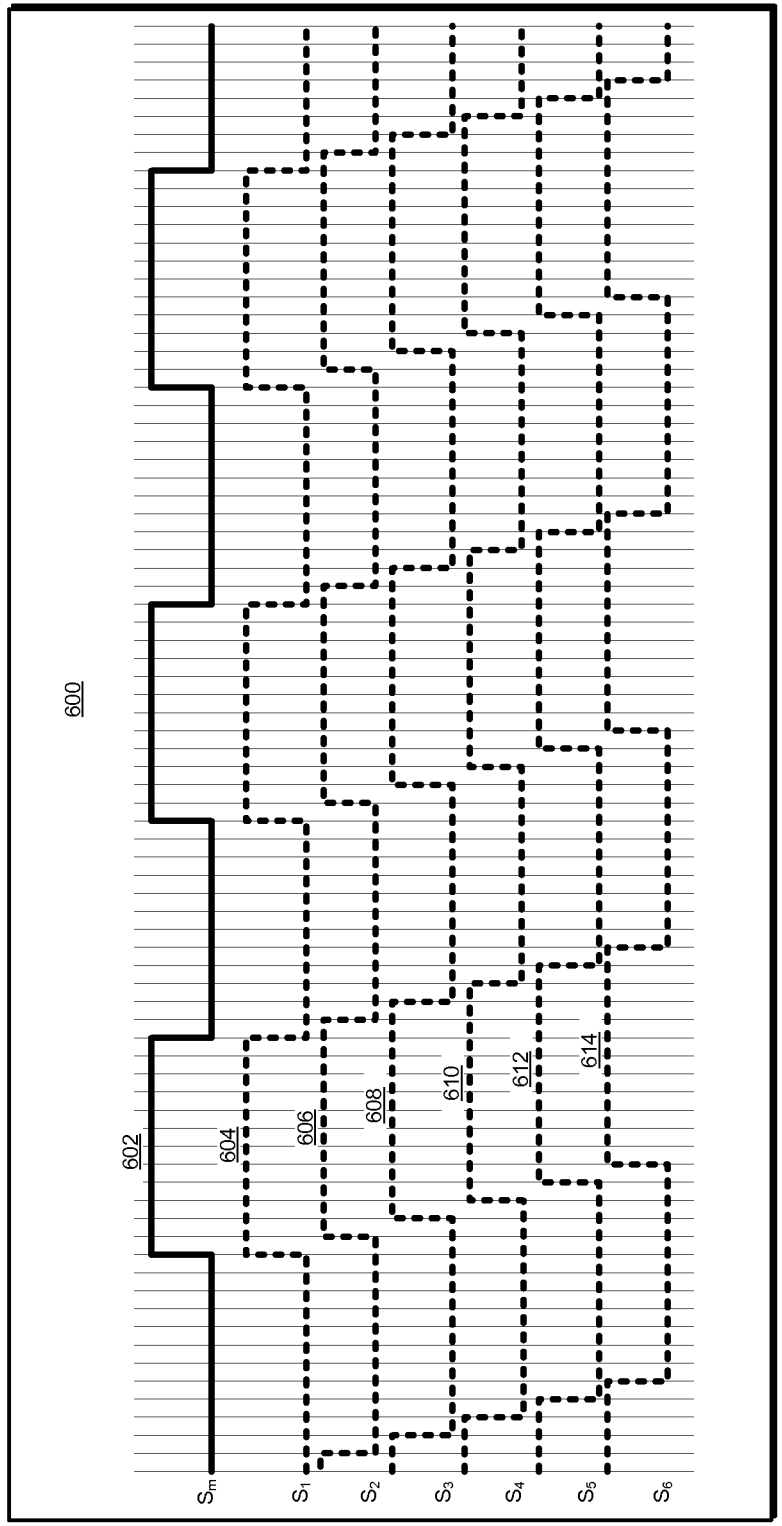
FIG. 6 depicts a graph of unsynchronized signals for detecting a power branch circuit associated with a data processing system in accordance with an illustrative embodiment.

With reference to FIG. 6, this figure depicts a graph of unsynchronized signals for detecting a power branch circuit associated with a data processing system in accordance with an illustrative embodiment. Graph 600 includes modulating signal 602, which is analogous to modulating signal 404 in FIG. 4.

Signal 604 is shown to be in-phase (fully correlated) with signal 602. Signal 606 is out of phase relative to signal 602 by a certain degrees. Signal 608 is more out of phase with signal 602 as compared to signal 606. Signal 610 is more out of phase with signal 602 as compared to signal 602. Signal 612 is more out of phase with signal 602 as compared to signal 610. Signal 614 is more out of phase with signal 602 as compared to signal 612. For the purposes of the following description, assume that signal 614 is ninety degrees out of phase with signal 602.

Square waveforms for modulation signal 602 and signals 604-614 are depicted and described for the clarity of the description only. Other waveforms that can satisfy the operations described below are possible, and contemplated within the scope of the illustrative embodiments.

Assume that the power curve is sampled at a fixed frequency—the sampling frequency ($F_{sampling}$)—in the power measuring system. Further assume that the modulating signal frequency ($F_{signal}$) is a factor of the sampling frequency by an integer i.

$$F_{signal} = F_{sampling}/i$$

The illustrative embodiments recognize, when these conditions exist, the problem of exhaustive search of phase reduces to a search of i phases.

According to a recognition by the illustrative embodiments, if signal 606 is used at the power measuring system, such as in power measuring system 310 in FIG. 3, the transitions in the waveform of signal 606 will be the points at which signal 606 will have an error, to wit, signal 606 will not match signal 602. Other than the leading edge transition of signal 606, trailing edge transition of signal 606, some portion of signal 606's flat waveform following the leading edge, and some portion of signal 606's flat waveform preceding the trailing edge, signal 606 is a good approximation of signal 602, but not as good as signal 604, which is fully correlated with the modulation signal—signal 602.

By a similar analysis, signal 608 is a poorer approximation of signal 602 than signal 606, but a better approximation of signal 602 as compared to signal 610. Signal 610 is a poorer approximation of signal 602 than signal 608, but a better approximation of signal 602 as compared to signal 612. Signal 612 is a poorer approximation of signal 602 than signal 610, but a better approximation of signal 602 as compared to signal 614.

At ninety degrees out of phase with signal 602, signal 614 yields a zero value when integrated over a sampling interval. In other words, in a problem of exploring i phases, only half of the phases (i/2) need to be explored or computed. The other cases are the negative of a phase already considered but at 180 degrees. Depending on the value of i selected in a particular implementation, i/2 number of signals 604-614 can be selected between zero and ninety degrees of phase relative of the modulating signal. Accordingly, Signal 604 is labeled $S_1$, signal 606 is labeled $S_2$, signal 608 is labeled $S_3$, signal 610 is labeled $S_4$, signal 612 is labeled $S_5$, and signal 614 is labeled $S_{i/2}$. Modulating signal 602 is labeled $S_m$.

A fully correlated signal, such as signal 604 has amplitude of 1 when combined with the modulating signal, such as signal 602. Conversely, a signal at ninety degrees, such as signal 614, when combined with the modulating signal, such as signal 602, will have amplitude of zero.

The above approach to reducing the search domain creates a potential for false positives, i.e., false identification of the modulating signal where no modulating signal may be present. To solve the problem of false positives, an embodiment combines with a power curve sample, a set of signals where signals range from being fully correlated with a modulating signal to being ninety degrees but of phase with the modulating signal being searched. An example signal set would include signals $S_1$, $S_2$, $S_3$, $S_4$, $S_5$, and $S_{i/2}$.

The square root of the sum of squares of a phase and the phase that is ninety degrees of i is equal to the amplitude of the signal for all phases, to wit, 1.

Applied Signal has fixed amplitude so the second derivative of the detected amplitude should be zero (small) over time.

Thus, if the modulating signal is present in the sample with which the set of signals is combined, the square-root of the sum of squares of the combined amplitudes will ideally be the 1 (i.e., the voltage of the modulating signal). If the modulating signal is not present in the power curve sample, the square-root of the sum of squares of the amplitudes will ideally be zero.

In practice, a threshold value, such as a threshold voltage $V_{th}$, can be used to detect the presence or absence of the modulating signal. For example a discriminator component is added to the power measuring system according to an embodiment. The discriminator component determines whether the amplitude of the combined signal resulting from correlating the signals of the set with the power curve sample exceeds the threshold voltage $V_{th}$. If the discriminator determines that the amplitude of the combined signal resulting from correlating the signals of the set with the power curve sample exceeds the threshold voltage $V_{th}$, then the discriminator indicates a presence of the modulating signal in the power curve sample, otherwise not. If the modulating signal is present in the power curve sample, the power branch circuit from which the sample is collected is collected, is deemed associated with the data processing system where the modulating signal is generated.

Figure 7:
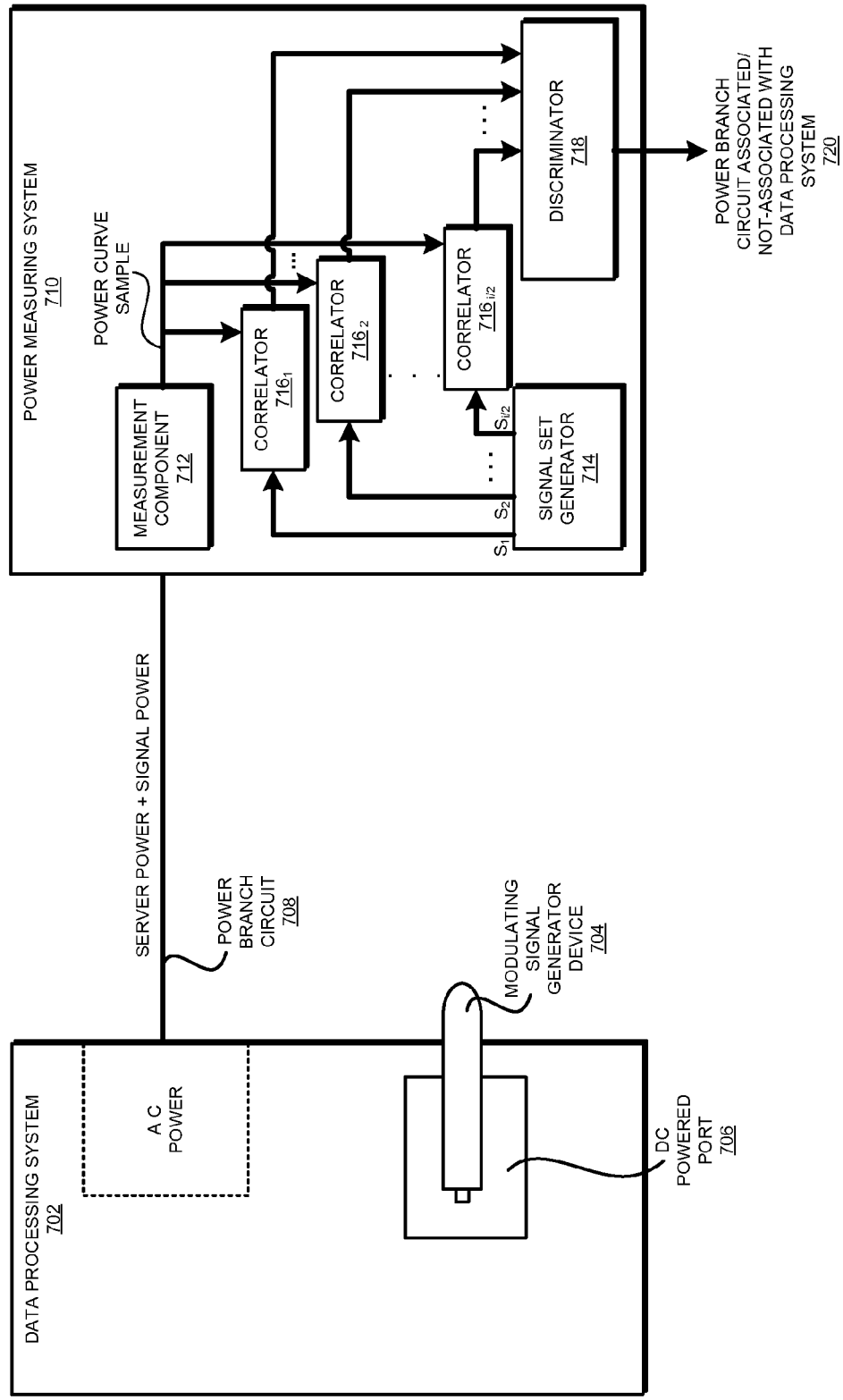
FIG. 7 depicts a block diagram of a configuration for branch circuit determination without synchronization in accordance with an illustrative embodiment.

With reference to FIG. 7, this figure depicts a block diagram of a configuration for branch circuit determination without synchronization in accordance with an illustrative embodiment. Data processing system 702 is analogous to data processing system 302 in FIG. 3.

Modulating signal generator device 704 is analogous to signal generator device 304 in FIG. 3 and couples to data processing system 702 using DC powered port 706 in a similar manner. Power branch circuit 708 supplies electrical power, typically alternating current (AC) power, to data processing system 702. Power measuring system 710 may be implemented using a combination of hardware and software, for measuring the power delivered over power branch circuit 708.

For example, in one embodiment, power measuring system 710 includes measurement component 712, which may be combination of hardware and software. In one embodiment, measurement component 712 is configured to sample the power curve corresponding to the power delivered over power branch circuit 708. An implementation may use another component for sampling the power curve within the scope of the illustrative embodiments.

Signal set generator 714 may be hardware or software. Correlators $716_1$, $716_2$, and $716_{i/2}$ may each be a software application or firmware. Discriminator 718 may be a software application or a component thereof. At least a part of power measuring system 710, such as a combination of signal set generator 714, correlators $716_{1 \text{ to } i/2}$, and discriminator 718, can be implemented as application 107 in FIG. 1.

Signal generator device 704 generates a low frequency low power DC load (signal) to modulate the AC power consumed by data processing system 702. Measurement component 712 measures the combined power consumption of data processing system 702 and signal generator device 704 during a sampling interval at a predetermined frequency of sampling, and captures a power curve sample.

Signal set generator 714 generates a set of signals that are i/2 in number where i equals the frequency of sampling divided by the frequency of the modulating signal. Furthermore, the signals in the signal set are of the same frequency as the modulating signal but range from zero degrees to one hundred and eighty degrees in phase with the modulating signal. For example, in one embodiment, as depicted in FIG. 7, signal set generator 714 generates signals $S_1, S_2, S_3, S_4, S_5$, and $S_{i/2}$ in FIG. 6.

Correspondingly, power measuring system 710 includes i/2 number of correlators, some instances of which are depicted and labeled $716_1$, $716_2$, and $716_{i/2}$. Signal set generator 714 provides a signal from the set to a corresponding correlator. Each correlator receives the power curve sample from measurement component 712 as well. Thus, as depicted, signal set generator 714 provides signal $S_1$ to correlator $716_1$, signal $S_2$ to correlator $716_2$, and signal $S_{i/2}$ to correlator $716_{i/2}$.

In the manner of correlator 316 in FIG. 3, each of correlators $716_{1\ to\ i/2}$ combines the signal received from signal set generator 714 with the power curve sample provided by measurement component 712. For example, correlator $716_1$ multiplies signal $S_1$ of signal set generator 714 with the power curve sample received from measurement component 712. Each of correlators $716_{1\ to\ i/2}$ provides the resulting amplitude to discriminator 718.

Discriminator 718 determines whether the amplitude of the combined signal resulting from correlating the signals of the signal set ($S_1$ to $S_{i/2}$) with the power curve sample exceeds a preset threshold voltage $V_{th}$. If the amplitude of the combined signal resulting from correlating the signals of the set with the power curve sample exceeds the threshold voltage $V_{th}$, then discriminator 718 outputs a value of indication 720, which indicates a presence of the modulating signal in the power curve sample. If the amplitude of the combined signal resulting from correlating the signals of the set with the power curve sample does not exceed the threshold voltage $V_{th}$, then discriminator 718 outputs another value of indication 720, which indicates an absence of the modulating signal in the power curve sample. If the modulating signal is present in the power curve sample, the power branch circuit from which the sample is collected is collected, is deemed associated with the data processing system where the modulating signal is generated.

Figure 8:
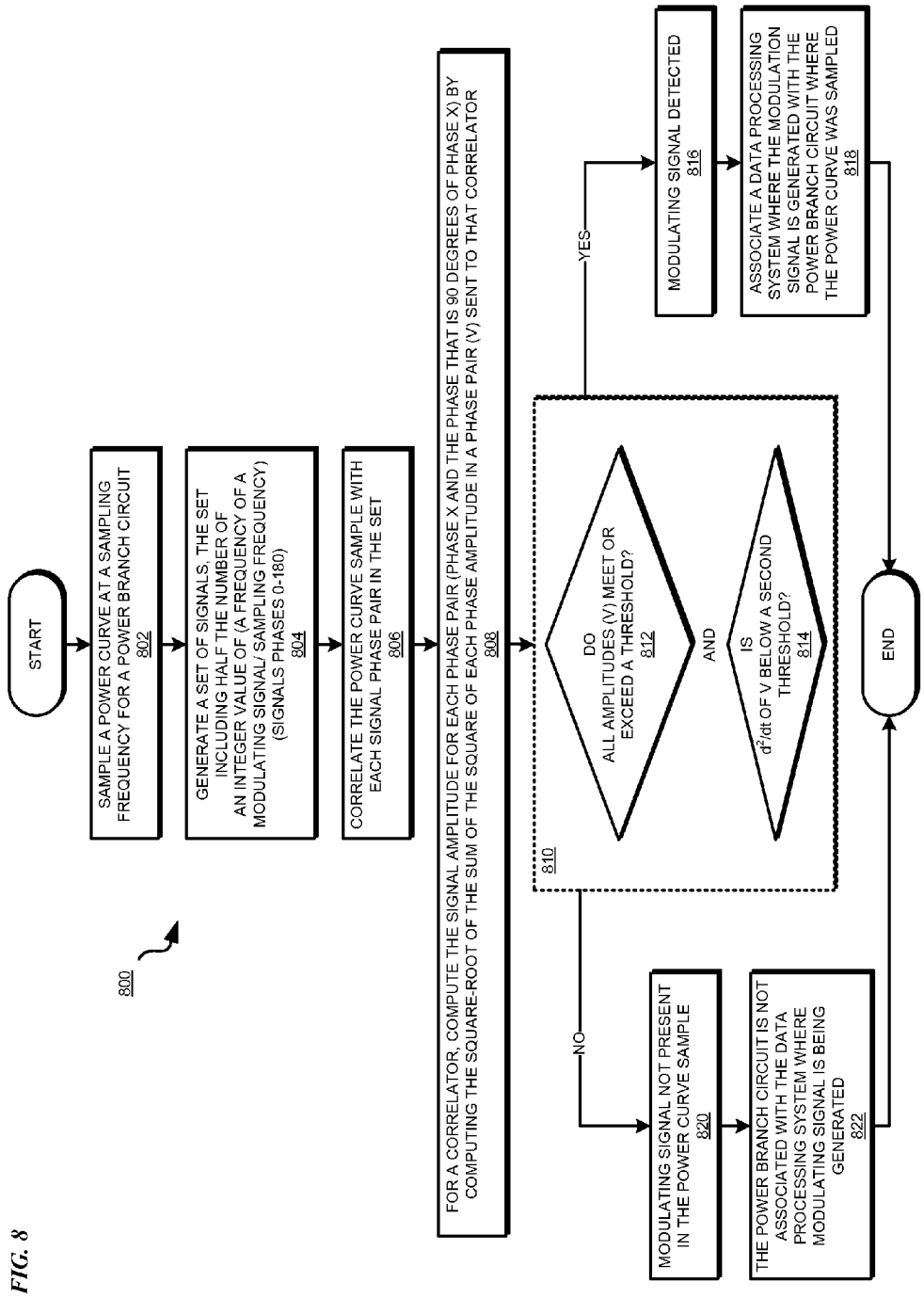
FIG. 8 depicts a flowchart of an example process for branch circuit determination without synchronization in accordance with an illustrative embodiment.

With reference to FIG. 8, this figure depicts a flowchart of an example process for branch circuit determination without synchronization in accordance with an illustrative embodiment. Process 800 can be implemented in a power measuring system, such as in power measuring system 710 in FIG. 7.

Process 800 begins by sampling at a sampling frequency a power curve for a power branch circuit (step 802). For example, process 800 may monitor and measure the per cycle power consumption over a power branch circuit and plot the measured power as a power curve over a period. Note that the power curve measured in this manner includes the power consumption of the data processing system as well as the power consumed by the low power modulating signal.

Process 800 generates a set of signals such that the set of signals includes half the integer value of the fraction (a frequency of the modulating signal divided by the sampling frequency) (step 804). As described earlier, the signals in the set of signals are of the same frequency as the modulating signal but vary in phases relative to the modulating signal from zero degrees to one hundred eighty degrees.

Process 800 correlates the power curve sample with each signal phase pair (signal of phase x and a signal of phase x+90 degrees) in the set of signals (step 806). For example, in one embodiment, process 800 may several instances of correlators in parallel to correlate each signal in the set with the power curve sample in parallel. In another embodiment, process 800 may use fewer instances of correlators to correlate a subset of signals in the set with the power curve sample in parallel. For example, an embodiment may use one correlator to serially correlate one signal from the set with the power curve sample, although such an implementation may have performance limitations that may be undesirable in some cases.

For each correlator, process 800 computes the signal amplitude for each phase pair (phase x and the phase that is 90 degrees of phase x) by computing the square-root of the sum of the square of each phase amplitude in a phase pair (the square-root of the sum of the square referred to as V) sent to that correlator generates an amplitude value from each correlation performed in step 806 (step 808). Process 800 submits the amplitude values to discrimination logic (step 810).

The discrimination logic of step 810 determines whether each of two conditions is true. The first condition evaluates whether all amplitudes V meet or exceed a threshold (step 812). In one embodiment, the first condition evaluates to 'True' also when all amplitudes V tend to a threshold within a tolerance. For example, the threshold may be a threshold voltage $V_{th}$ described earlier. The second condition determines whether the second derivative of V is below a second threshold (step 814). For example, the second threshold may be an insignificantly small fraction of $V_{th}$ to detect noise generated V, which under ideal circumstances would be zero.

The output of the discrimination logic is true ("Yes" path of step 810), if the result of both steps 812 and 814 is true. The output of the discrimination logic is false ("No" path of step 810), if the result of any of steps 812 and 814 is false.

If the output of the discrimination logic is true, process 800 concludes that the modulating signal has been detected in the power curve sample (step 816). Accordingly, process 800 associates, or supports associating, the data processing system where the modulating signal is generated with the power branch circuit where the power curve was sampled (step 818). Process 800 ends thereafter.

If the output of the discrimination logic is false, process 800 concludes that the modulating signal is not present in the power curve sample (step 820). Accordingly, process 800 concludes that the data processing system where the modulating signal is generated is not associated with the power branch circuit where the power curve was sampled (step 822). Process 800 ends thereafter.

Figure 9:
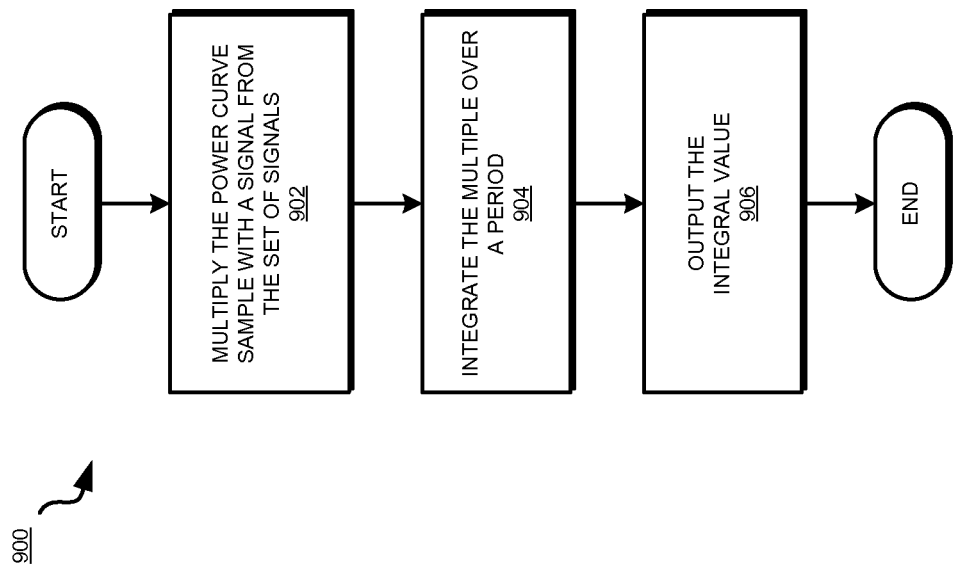
FIG. 9 depicts a flowchart of an example process for correlating a signal with a power curve sample for branch circuit determination without synchronization in accordance with an illustrative embodiment.

With reference to FIG. 9, this figure depicts a flowchart of an example process for correlating a signal with a power curve sample for branch circuit determination without synchronization in accordance with an illustrative embodiment. Process 900 can be implemented as step 806 in process 800 of FIG. 8. Process 900 can be implemented in a correlator, such as any of correlators $716_{1\ to\ i/2}$ in FIG. 7.

Process 900 multiplies the power curve sample with a signal from a set of signals, such as the set of signals generated in step 804 in FIG. 8 (step 902). Process 900 integrates the multiple of the power curve sample and the signal over a period (step 904). Process 600 outputs the integrated multiple of the power curve and the second signal (the integral) (step 906). Process 900 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for correlating a power branch circuit with a system without using a synchronous signal. Using an embodiment of the invention the relationship between a system and a power branch circuit can be established without the facilities personnel logging on to the system or otherwise gaining access to the applications executing on the system. Using an embodiment, the relationship can be established without consuming significant excess power, and without having the system transmit an identifier.

In one embodiment, the signal generator device can be integrated into the system with a button or other similar interface exposed to the facilities personnel. The personnel can press the button or otherwise activate the interface without gaining access to the system. Thereafter, the subsequent detection can occur as described herein.

In another embodiment, the signal generator device can be integrated into the system with a provision to receive a command over a data network. The facilities personnel can transmit the command to activate the signal generator device using a system to which they do have access but without gaining access to the system where the Signal generator device is present. Thereafter, the subsequent detection can occur as described herein.

Although several embodiments are described using the signal generator device in conjunction with a port or interface on a system that typically operates using DC power, such description is not intended to exclude the use of an embodiment with AC powered ports on the system. For example, a system may offer an AC power outlet on the system such that another peripheral of the system may receive AC power from the system. An embodiment may use a suitably configured signal generator device in conjunction with such an AC port on the system in a manner described herein to achieve similar results within the scope of the invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "device," "module" or "system." Furthermore, aspects of the present invention May take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a.", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer implemented method for relating a data processing system with a power branch circuit, the method comprising:
   combining, to form a set of combination signals, each signal in a set of signals with a power signal, the power signal including a first power usage by the data processing system and a second power usage by a modulating signal;
   determining, using a processor and a memory, an amplitude of a corresponding signal in each combined signal in the set of combined signals over a period;
   determining, using a discriminating logic, whether the modulating signal is present in the power signal; and
   relating, responsive to the discriminating logic producing an affirmative result, the data processing system with the power branch circuit.

2. The computer implemented method of claim 1, wherein the power signal is sampled at the sampling frequency.

3. The computer implemented method of claim 1, further comprising:
   generating the set of signals, wherein the set of signals includes a number of signals such that the number is an integer value of one half of a fraction, the fraction being represented as a sampling frequency over a frequency of the modulating signal.

4. The computer implemented method of claim 1, wherein a signal in the set of signals has a different phase between zero degrees and one hundred and eighty degrees relative of a the modulating signal.

5. The computer implemented method of claim 1, wherein each signal in the set of signals is of the frequency of the modulating signal.

6. The computer implemented method of claim 1, wherein the discriminating logic comprises:
   computing, forming an amplitude value, a square-root of a sum of squares of the amplitudes of a pair of phases separated by ninety degrees in each combined signal in the set of signals;
   evaluating whether the amplitude value exceeds a threshold;
   further evaluating whether a second derivative of the amplitude value is below a second threshold; and
   producing an affirmative output from the discriminating logic when the evaluating and the further evaluating are both affirmative.

7. The computer implemented method of claim 1, wherein the amplitude of the corresponding signal in each combined signal in the set of combined signals is computed by:
   multiplying, forming a multiplication value, the power curve with the signal;
   integrating, forming an integral value, the multiplication value over the period; and
   outputting the integral value as the amplitude.

8. The computer implemented method of claim 1, wherein the modulating signal is a low power and low frequency load applied to the data processing system using a signal generator device.

9. The computer implemented method of claim 1, wherein the signal generator device is coupled with the data processing system using a direct current powered port on the data processing system.

10. The computer implemented method of claim 1, wherein the signal generator device is coupled with the data processing system using an alternating current powered port on the data processing system.

11. A computer usable program product comprising a computer usable storage device including computer usable code for relating a data processing system with a power branch circuit, the computer usable code comprising:
   computer usable code for combining, to form a set of combination signals, each signal in a set of signals with a power signal, the power signal including a first power usage by the data processing system and a second power usage by a modulating signal;
   computer usable code for determining an amplitude of a corresponding signal in each combined signal in the set of combined signals over a period;
   computer usable code for determining, using a discriminating logic, whether the modulating signal is present in the power signal; and
   computer usable code for relating, responsive to the discriminating logic producing an affirmative result, the data processing system with the power branch circuit.

12. The computer usable program product of claim 11, wherein the power signal is sampled at the sampling frequency.

13. The computer usable program product of claim 11, further comprising:
   computer usable code for generating the set of signals, wherein the set of signals includes a number of signals such that the number is an integer value of one half of a fraction, the fraction being represented as a sampling frequency over a frequency of the modulating signal.

14. The computer usable program product of claim 11, wherein a signal in the set of signals has a different phase between zero degrees and one hundred and eighty degrees relative of a the modulating signal.

15. The computer usable program product of claim 11, wherein each signal in the set of signals is of the frequency of the modulating signal.

16. The computer usable program product of claim 11, wherein the discriminating logic comprises:
   computer usable code for computing, forming an amplitude value, a square-root of a sum of squares of the amplitudes of a pair of phases separated by ninety degrees in each combined signal in the set of signals;
   computer usable code for evaluating whether the amplitude value exceeds a threshold;
   computer usable code for further evaluating whether a second derivative of the amplitude value is below a second threshold; and
   computer usable code for producing an affirmative output from the discriminating logic when the evaluating and the further evaluating are both affirmative.

17. The computer usable program product of claim 11, wherein the amplitude of the corresponding signal in each combined signal in the set of combined signals is computed by:
   computer usable code for multiplying, forming a multiplication value, the power curve with the signal;
   computer usable code for integrating, forming an integral value, the multiplication value over the period; and
   computer usable code for outputting the integral value as the amplitude.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A data processing system for relating a data processing system with a power branch circuit, the data processing system comprising:
   a storage device including a storage medium, wherein the storage device stores computer usable program code; and
   a processor, wherein the processor executes the computer usable program code, and wherein the computer usable program code comprises:
   computer usable code for combining, to form a set of combination signals, each signal in a set of signals with a power signal, the power signal including a first power usage by the data processing system and a second power usage by a modulating signal;
   computer usable code for determining an amplitude of a corresponding signal in each combined signal in the set of combined signals over a period;
   computer usable code for determining, using a discriminating logic, whether the modulating signal is present in the power signal; and
   computer usable code for relating, responsive to the discriminating logic producing an affirmative result, the data processing system with the power branch circuit.

* * * * *